June 19, 1956 K. SCHLESINGER ET AL 2,751,554
ELECTRONIC DISPLAY MEANS
Filed April 22, 1952 3 Sheets-Sheet 1
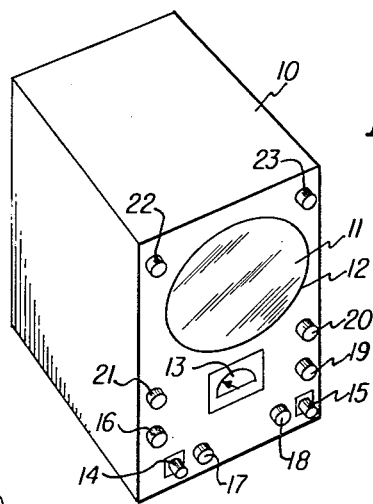
FIG. 1
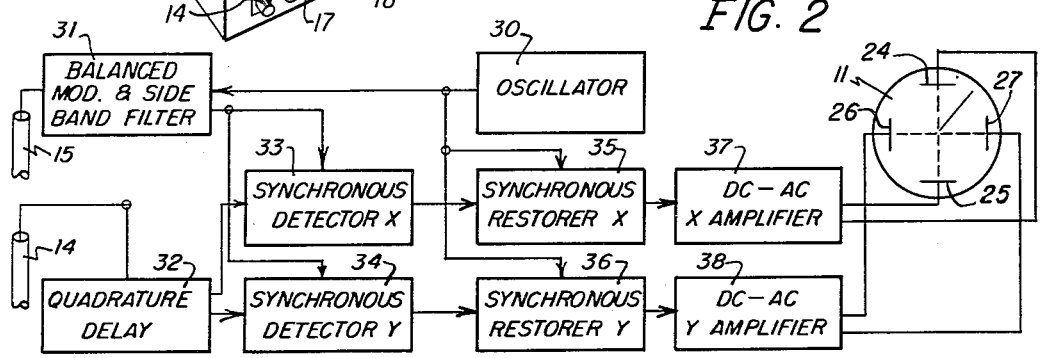
FIG. 2
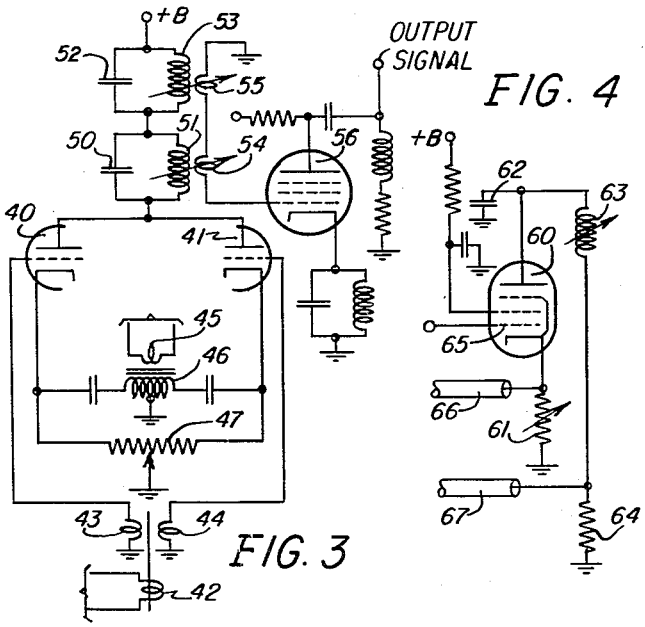
FIG. 3
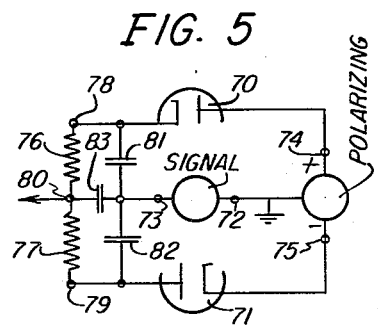
FIG. 4
FIG. 5
INVENTORS
Kurt Schlesinger
Leroy W. Nero
BY
Foorman L. Mueller Atty.

INVENTORS
Kurt Schlesinger
Leroy W. Nero

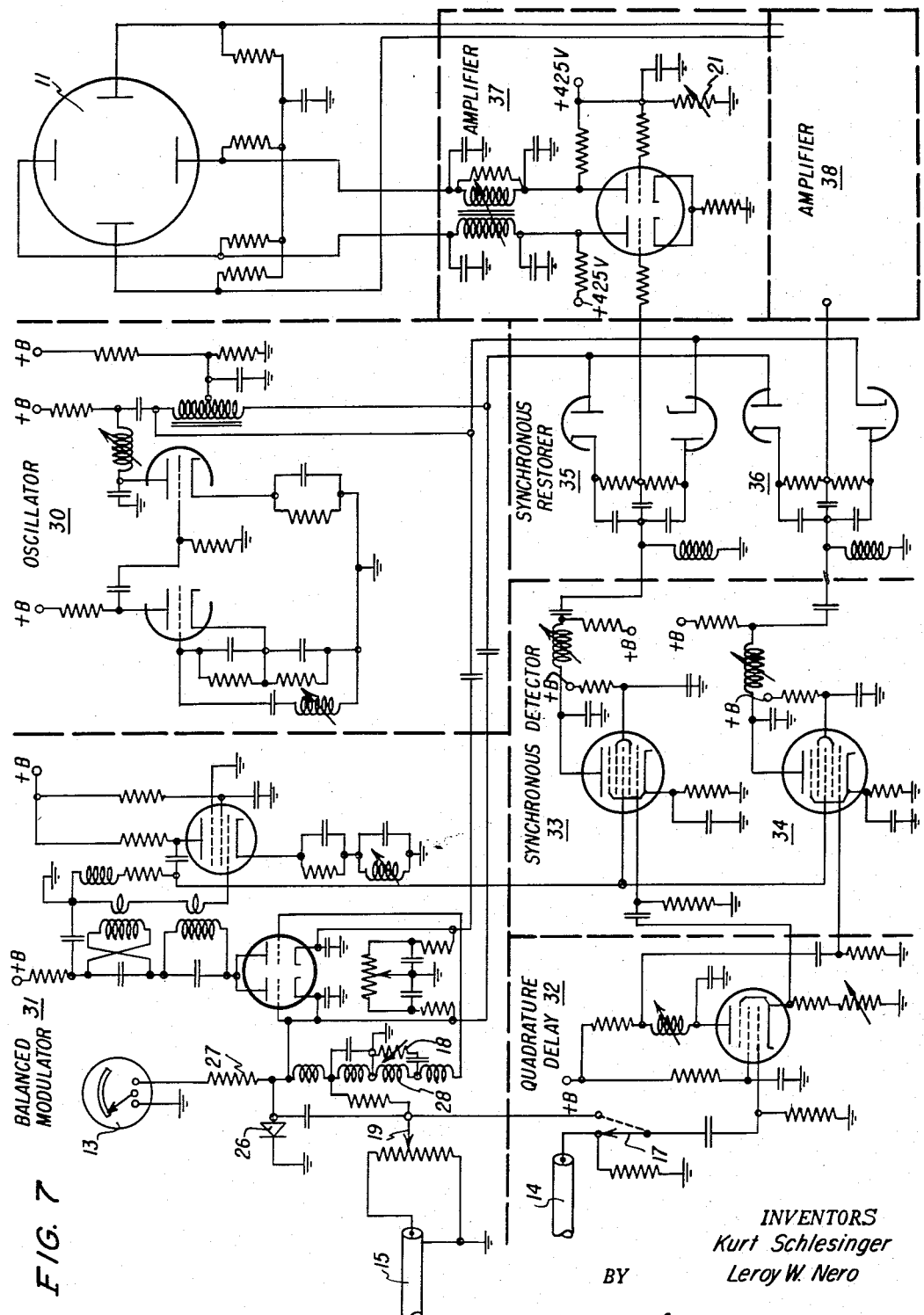

United States Patent Office 2,751,554
Patented June 19, 1956

2,751,554

ELECTRONIC DISPLAY MEANS

Kurt Schlesinger, Maywood, and Leroy W. Nero, Chicago, Ill., assignors to Motorola, Inc., Chicago, Ill., a corporation of Illinois Application April 22, 1952, Serial No. 283,784

6 Claims. (Cl. 324—88)

This invention relates generally to phase measuring and indicating equipment and more particularly to such equipment including cathode ray tube means for instantaneously displaying the phase and amplitude of a signal to be observed.

There are many applications wherein it is desired to observe or measure the instantaneous phase of one signal with respect to a reference signal of the same frequency and to simultaneously indicate the amplitude of the signal. One such example is in color television systems of the band-shared type wherein the chromaticity information is transmitted by a subcarrier wave, the amplitude and phase of which are used to transmit saturation and hue of the colors, respectively. Another application of such a device is in connection with the relaying of signals wherein it is desired to compare signals at the output of a station or system with the signal at the input thereof.

Various equipments for giving phase indications, such as mechanical phase shifters, have been provided but have not been found to be completely satisfactory. These equipments have been quite complicated and are critical of adjustment. Other disadvantages are that some of these systems are difficult to interpret and are applicable only to steady state conditions. Further, such systems do not indicate phase directly, but must be hand set, and then read.

It is therefore an object of the present invention to provide a relatively simple apparatus for directly displaying the phase and amplitude of a signal to be observed.

A further object of the invention is to provide an oscilloscope for directly displaying vectors which indicate the phase of one or more signals with respect to a reference signal.

Another object of this invention is to provide phase indicating apparatus including modulating and detector means for combining a test signal and a reference signal with local oscillations to obtain oscillations for deflecting the beam of a cathode ray tube so that the test signal is displayed on the tube as a vector, with the phase and amplitude thereof being accurately reproduced.

A feature of this invention is the provision of phase displaying apparatus including a local oscillator and a modulator for controlling the amplitude of two components of the local oscillations in accordance with the quadrature components of the phase difference between a test signal and a reference signal, the two components being used as right angle deflection voltages for the cathode ray tube. The amplitude of the oscillations may also be varied with the amplitude of the test signal so that the tube will display a vector representing both the phase and amplitude of the test signal.

A further feature of the invention is the provision of phase displaying apparatus including delay means for providing quadrature components from a signal to be observed, a balanced modulator for combining a reference signal with local oscillators to provide a decoding signal, and synchronous detector means for mixing the quadrature components of the test signal and the decoding signal to provide quadrature sweep voltage at the local oscillator frequency which vary in amplitude with the quadrature components of the phase difference of the test signal with respect to the reference signal, and which also vary with the amplitude of the test signal.

Another feature of the invention is the provision of apparatus for displaying the phase of a test signal on a cathode ray tube screen, in which synchronous restorer means provide direct current components for the sweeping voltages so that the vectors displayed will radiate outwardly from the center and the exact phase of all vectors is readily distinguishable. Balanced amplifiers are provided which amplify both the direct current component and the sweep voltages and provide balance of both the direct current and alternating current components.

Further objects, features and the attending advantages of the invention will be apparent from a consideration of the following description when taken in connection with the following drawings, in which:

Fig. 1 is a perspective view showing the vector displaying apparatus in accordance with the invention;

Fig. 2 is a block diagram of the system;

Fig. 3 illustrates a circuit which may be used as the balanced modulator in the system of Fig. 2;

Fig. 4 illustrates a circuit which may be used to provide the quadrature delay in the system of Fig. 2;

Fig. 5 illustrates a synchronous restorer circuit suitable for use in the system of Fig. 2;

Fig. 7 is a complete circuit diagram of a practical embodiment of the system in accordance with the invention;

Figure 6:
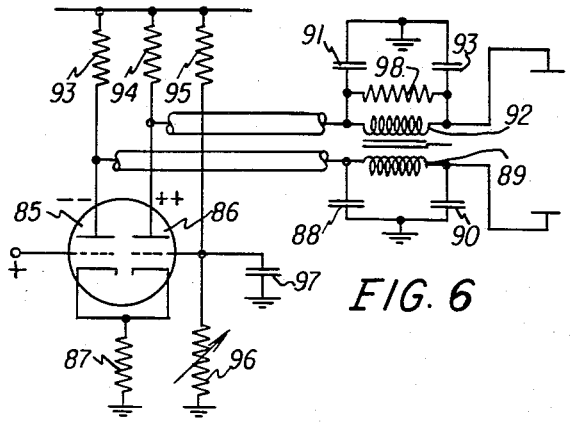
Fig. 6 illustrates a deflection amplifier circuit suitable for use in the system of Fig. 2.

In practicing the invention there is provided a system for displaying the phase and amplitude of a signal to be examined (test signal). The system includes a local oscillator which provides the sweep or writing oscillations to form the display, and a balanced modulator for combining a reference signal and the output of the oscillator to produce what might be called a decoding signal. The modulator may be of the balanced type wherein the fundamental frequencies of the test signal and oscillator output are balanced out, and includes filter means for selecting only the sidebands produced by the modulation. The test signal is applied to quadrature delay means which provides a 90° phase shift. Two components of the test signal, in phase quadrature with each other, are applied to separate synchronous detectors, where they beat with the decoding signal. The synchronous detector means includes output filters for selecting only the writing frequency. The signals produced by the two detectors are suitable for application to the deflection plates of an oscilloscope for displaying the phase of the test signal. In order to provide a direct current component to the signals from the detectors, so that the vectors displayed radiate from the center and therefore vectors at 180° with respect to each other are readily distinguishable, synchronous restorers are provided. These restorers utilize the output of the local oscillator to provide polarized direct current components to the outputs of the synchronous detectors. The sweep voltages therefore include direct current components so that the vectors radiate from a center point on the scope. The signals are applied to the deflection plates of the scope through amplifiers which provide balanced direct current components and also sweep frequency components which provide a trace on the screen to thereby display the vector both as to phase and amplitude.

The vector display apparatus may be used directly for only one fixed frequency, but signals of other frequencies may be displayed by converting them to the frequency of the apparatus. Signals of other fixed frequencies may be converted to the frequency of the apparatus by simple heterodyning processes, and signals of variable frequency may be handled through the use of transponder units which provide a fixed frequency output.

Referring now to the drawings, in Fig. 1 there is illustrated the physical structure of the vector displaying scope. The scope disclosed uses a 5-inch cathode ray tube and has the same overall dimensions of a standard 5-inch oscilloscope. The scope is enclosed in housing 10 with the face of the cathode ray tube 11 being viewed from an opening 12 in the front panel thereof. On the front panel there is also provided a meter 13, coaxial connectors 14 and 15 for connection to the test signal and a reference signal, respectively, and a plurality of switches and controls. The switch 16 controls the application of power to the system, switch 17 makes connections for checking the phase, control 18 provides adjustment of the zero phase position, and control 19 adjusts the level of the reference signal. Controls 20 and 21 control the horizontal and vertical positions of the trace on the screen respectively, and controls 22 and 23 adjust the intensity and focus of the beam of the scope tube.

In Fig. 2 the system of the display apparatus is shown in block diagram form. The terminals 14 and 15, to which the test and reference signals are applied, respectively, are the coaxial connectors on the front of the housing. The system illustrated is particularly applicable for use in color television for determining the phase of the subcarrier which has a frequency of 3.9 megacycles. For use in such a system the local oscillator 30 may have a frequency of 1 megacycle. The output of this oscillator may then be represented by $k \cos \Omega t$ where $\Omega/2\pi$ is equal to 1 megacycle. This output is combined with the reference signal which may be represented by $e_0 \cos \omega t$ in the balanced modulator 31. The balanced modulator is of the type wherein both the reference signal and the oscillator wave are balanced out and may include an output filter which selects only the two sidebands which are at 2.9 and 4.9 megacycles. The amplitude of the two sidebands are made equal in amplitude so that the combined output may be represented by the expression $$e_0 \cos \omega t \cos \Omega t$$

Since the wave from the oscillator is of greater amplitude than the reference signal, the amplitude of the oscillator wave does not enter into the equation for the sidebands. This signal formed by the sidebands will be referred to as the decoding signal.

The test signal applied at point 14 may be represented by $A \cos (\omega t + \phi)$ where A represents the amplitude and $\phi$ the phase difference with respect to the reference signal. The test signal is applied to a quadrature delay unit 32 which provides two outputs of the same amplitude, but differing in phase by 90°. These outputs may be represented as $A \cos (\omega t + \phi)$ and $A \sin (\omega t + \phi)$. The test signal components in phase quadrature are applied respectively to synchronous detectors 33 and 34 which provide signals for deflection of the cathode ray beam in the X and Y directions, respectively. The decoding signal is also applied to the synchronous detectors from the balanced modulator 31. The synchronous detectors have output filters which pass only frequencies of 1 megacycle and therefore the signals of the frequencies of the reference and test signals are not passed. Accordingly, the signals at the output of the detector 33 is $\tfrac{1}{2} e_0 A \cos \phi \cos \Omega t$ and the output of the detector 34 is $\tfrac{1}{2} e_0 A \sin \phi \cos \Omega t$. It is to be noted that these waves are oscillations at the writing frequency, and the amplitudes of the waves depend upon $e_0$, the amplitude of the reference signal, A, the amplitude of the test signal, and either $\cos \phi$ or $\sin \phi$, the quadrature components of the phase difference between the reference and test signals. These signals may be applied directly to the deflection plates of a cathode ray tube to provide the display of a vector of correct phase and amplitude which is swept through the center of the screen by the frequency of the local oscillator (1 megacycle).

However, such a display would not give complete information since signals having 180° difference in phase would appear identically. It is therefore desired to provide a shift of the vectors so that each vector starts from the center of the screen. This is accomplished by the synchronous restorers 35 and 36 to which the output of the synchronous detectors 33 and 34 are applied. The output of the oscillator 30 is applied in balanced form to the restorers 35 and 36 and serves as a polarizing wave therefor. The output of the restorer 35 then becomes $$\tfrac{1}{2} e_0 A \sin \phi (1 + \cos \Omega t)$$

and the output of the restorer 36 becomes $$\tfrac{1}{2} e_0 A \cos \phi (1 + \cos \Omega t)$$

The outputs of the synchronous restorers are amplified respectively in amplifiers 37 and 38 which amplify both the D. C. and 1 megacycle component. The amplifier 37 provides the X component which is applied to the vertical deflection plates 24 and 25 and the amplifier 38 provides the Y or horizontal component which is applied to the horizontal deflection plates 26 and 27.

In Fig. 3 there is illustrated one form of a balanced modulator such as is suitable for use as the balanced modulator 31 of the system of Fig. 2. This modulator is formed by a pair of triodes 40 and 41 which may be included in a single envelope. The reference signal is applied to the grids of the two triodes through the transformer including primary winding 42 and the two secondary winding portion 43 and 44, respectively. The writing signal from the oscillator 30 is applied to the cathodes of the triodes through a transformer including primary winding 45 and the center tapped secondary winding 46. Balance is provided by the adjustable contact on the resistor 47. The plates of the two triodes are connected together with the plate circuit being tuned to the two sidebands. That is, the resonant circuit including condenser 50 and primary winding 51 is resonant at a frequency which is the sum of the reference signal and the writing frequency $(\omega + \Omega)$ and the resonant circuit including condenser 52 and primary winding 53 is resonant at the difference frequency $(\omega - \Omega)$. The secondary windings 54 and 55 are connected in series so that the two sidebands are added. The sidebands are then amplified in the pentode 56. The secondary windings 54 and 55 may be adjusted with respect to the primary windings 51 and 53 so that the sidebands are of equal amplitude.

In Fig. 4 there is illustrated a circuit which may be used for the quadrature delay means 32 in the system of Fig. 2. The circuit includes a pentode tube 60 to the grid 65 of which the test signal is applied. This signal appears in the same phase across the cathode resistor 61. The plate circuit is tuned by condenser 62 and inductor 63 with the quadrature voltage being derived across resistor 64. In order for the desired condition to be met that the voltage across resistors 61 and 64 are of equal magnitude, the impedance of resistor 61 must be equal to the impedance of the plate capacitor 62. This may be adjusted by the variable resistor 61. The quadrature relation may be established by the tuning of the inductor 63. The quadrature test signal components are then obtained at the lines 66 and 67.

The circuit of the synchronous restorers such as illustrated at 35 and 36 in Fig. 2, is shown in Fig. 5. It is to be noted that this circuit includes two diodes 70 and 71 connected in series aiding relation. The signal from the synchronous detector (33 or 34) is applied to the terminals 72 and 73 and the balanced output of the oscillator 30 is applied to the terminals 74 and 75. The amplitude of the signal from the oscillator, which may be considered a polarizing wave, is much greater than the signal applied from the synchronous detector. The voltages developed across the two diodes are combined differentially through the resistors 76 and 77, with the resultant appearing at point 80. When the potential of the polarizing wave at point 74 is positive and at point 75 is minus the diodes will conduct to provide a positive potential at point 78 and a negative potential at point 79. The signal at point 73 is applied to the diodes 70 and 71 through condensers 81 and 82 and combined with the polarizing wave to increase the potential at point 78 and decrease the potential at the point 79.

As previously stated, the wave from the oscillator may be represented $k \cos \Omega t$. The wave from the detector is $\frac{1}{2} e_0 A \cos \phi \cos \Omega t$. Since $\frac{1}{2} e_0 A \cos \phi$ is a constant, this may be represented by $a$. As previously stated, the polarizing wave is much larger than the wave from the detector and must be at least twice as great as the detector signal. Therefore $k$ is greater than $2a$. Accordingly, the rectified voltage at point 78 is equal to $(k/2+a)$ and the voltage at point 79 is equal to $(k/2-a)$. These voltages are combined differentially so that the output is $\frac{1}{2}[(k/2+a)-(k/2-a)]$. It is obvious that this result is equal to $a$ so that the direct current provided is equal to the amplitude of the A. C. component. The D. C. component is also of the same polarity as the A. C. component so that polarized restoring action is provided. The direct current potential at point 80 is combined with the detected signal at point 73 through the condenser 83. The combined wave therefore is $$\frac{1}{2} e_0 A \cos \phi (1+\cos \Omega t)$$

It is therefore seen that the synchronous restorer will provide sign conscious reinsertion, that is, one wherein the sign of the reinsertion will depend upon the sign of the signal and the reinsertion voltage will also be equal to the signal voltage. This will shift all signals so that they will start at a common center point.

Figure 6A:
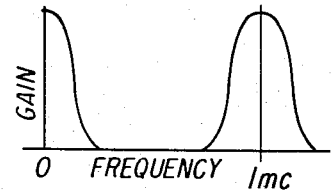
Fig. 6a illustrates the characteristics of the amplifier of Fig. 6.

In Fig. 6 there is shown the detail circuit of one of the amplifiers 37 or 38 in the system of Fig. 2. This amplifier provides a push-pull output as required for the deflection plates from a single ended input. The amplifier includes the triodes 85 and 86 which may be included in a single envelope. The signal is applied to the grid of the first triode and is coupled through the common cathode resistor 87 to the second triode. It will be apparent that the amplifier must pass both the D. C. component and the component centered at 1 megacycle and therefore the amplifier must have a response as indicated by Fig. 6a. In order to provide response at 1 megacycle, tuned circuits are provided in the plate including condenser 88, inductor 89 and condenser 90 coupled to the plate of the triode 85, and condenser 91, inductor 92 and condenser 93 coupled to the plate of the triode 86.

In order to provide a completely balanced output, it is necessary to make the resistor 93 in the plate circuit of the triode 85 substantially smaller than the resistor 94 in the plate circuit of the triode 86. In the circuit used the double triode used was of the 12BH7 type and in such case the resistor 93 used is 7,000 ohms, resistor 92 is 22,000 ohms, and the resistor 87 is 820 ohms. These values were found to provide balanced outputs for a 5-inch oscilloscope tube. In order to balance the Q-factor of the two tank circuits for the 1 megacycle frequencies, a resistor 98 is bridged across the coil 92. It is to be noted that the coils 89 and 92 are closely coupled. Centering is provided by the voltage divider including resistor 95 and resistor 96, the resistor 96 being variable to provide adjustment. The condenser 97 bypasses the grid for high frequencies.

In Fig. 7 there is shown a complete circuit diagram of a vector displaying scope in accordance with the invention as has been constructed and successfully tested. The circuit corresponds to the block diagram of Fig. 2 and also corresponds generally to the circuit diagrams of the various components illustrated in Figs. 3 to 6 inclusive. However, the circuit of Fig. 7 is more detailed, while the circuit diagrams of Figs. 3 to 6 inclusive have been simplified for the purpose of describing the operation of the system. Items such as the oscillator 30 and the synchronous detectors 33 and 34 may be of standard construction and have not been described in detail. It is believed, however, that the circuit shown in Fig. 7 will be well understood by those skilled in the art.

It is noted that the reference signal applied to the terminal 15 is applied across a potentiometer having a variable control which is indicated by the control 19 on the front panel. This adjusts the level of the reference signal $e_0$. This level is indicated by the meter 13 on the front panel, which is coupled to the variable control through rectifier 26 and resistor 27. The switch 17 which is also provided on the front panel is arranged to selectively connect the reference signal to the test signal channel. It is obvious that when this connection is made the vector shown on the scope should be at zero phase. An adjustment is provided to compensate for slight changes in phase, being effected by the variable resistor 18 connected across a section 28 of the coil which provides balanced reference signals to the two stages of the balanced modulator. This resistor may therefore be varied to provide a zero set adjustment for the vector displaying scope as a whole.

Of the other controls provided on the front panel the vertical position control is provided by the variable resistor 21 of the vertical amplifier. Since the vertical and horizontal amplifiers may be identical, the horizontal amplifier is not shown. Accordingly, the control 20 for the horizontal position is not shown but will be similar in every respect to the control 21 for vertical position.

Figure 8:
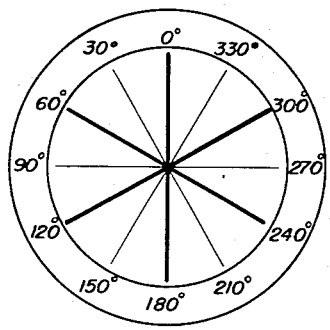
Figs. 8, 9 and 10 illustrate displays produced by the apparatus in accordance with the invention.
Figure 9:
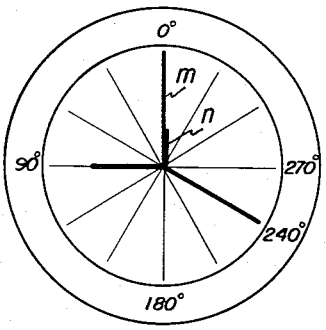
Figure 10:
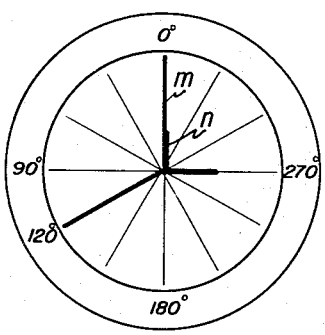

As previously stated, the vector displaying scope is suitable for use in many applications. In Figs. 8, 9 and 10 there are illustrated the displays provided when the scope is used in certain particular applications. Fig. 8 illustrates the use of the scope to display six vectors extending at angles of 60° with respect to each other. This illustrates the accuracy of the display. This display was produced by the use of a delay line one wavelength long at the frequency of the unit (3.9 megacycles), with the delay line being tapped at equal delay points, and contact made from the taps to the scope through a sequencer wherein the contacts were changed 360 times per second.

Figs. 9 and 10 illustrate the vector display provided from the color test picture wherein the three primary colors are provided by three vectors of varying length and positioned with predetermined phase relationships. The two relationships for the even and odd fields are illustrated in these two figures. It is to be noted that the vector at zero degrees is actually a double vector, the long vector $m$ being the axis of the color system and the short vector $n$ being the vector for one of the primary colors.

As previously stated, the vector displaying scope may be of particular utility in examining the delay characteristics of a transmission system which may be a complex system such as a radio relay system or a simple system such as an amplifier. In such case it may be desirable to use the equipment with signals which vary in frequency and to do this a system such as disclosed in Fig. 11 may be used.

Figure 11:
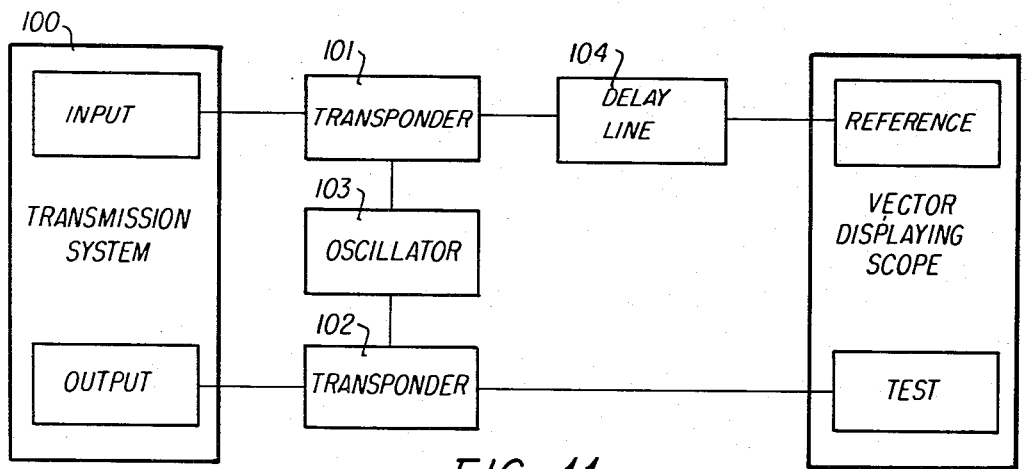
Fig. 11 illustrates schematically the use of the vector displaying apparatus for indicating the phase delay of signals of varying frequency when transmitted through a complete system.

In Fig. 11 the transmission system 100 may be any system whose transfer characteristic is to be determined. It is assumed that in such a system the signals will occupy a wide band of frequencies. If the frequency does not vary but is constant, then the system can be connected directly to the vector displaying scope or through a heterodyning system as will be described. In order to provide a fixed frequency to the vector displaying scope from an arbitrary frequency used for the test, the input for the transmission system is applied to a transponder 101 and the output is applied to a similar transponder 102. These transponders may be double modulators which turn out a fixed frequency F from any signal frequency. F is the frequency to which the vector displaying scope responds. This frequency is produced at any time that there is an input to the transponder which falls within a predetermined frequency range.

Such a transponder is disclosed in the article entitled "Dot arresting improves TV picture quality," published in Electronics Magazine, September 1951, page 96. Briefly, an oscillator operating at the frequency F is beat with the frequency $f$ applied to the transponder. The sideband $F+f$ is selected. This sideband is again beat with the signal frequency $f$. Thus, the fixed frequency F is reproduced and this frequency is selected at the output of the transponder. The output thus produced is at a constant frequency F but will contain the phase information of the applied signal. If two identical transponders are used, their outputs F will have the same relative phase as the inputs $f$. The output will also be proportional in amplitude to the signal at frequency $f$. A single fixed frequency oscillator 103 must be used for both transponders 101 and 102.

It may be desirable to include a delay line 104 between the transponder 101 and the reference terminal of the vector displaying scope to compensate for the known delay produced in the transmission system so that the scope will only show the delay which is to be determined. This will be of particular use in the event that the transmission system is a long relay system wherein a large delay would be normally encountered.

It is obvious that there are many other applications in which the scope would be of great advantage. The scope can be used for fixed frequencies other than the frequency for which it is designed merely by heterodyning the reference signal and the test signal to the frequency of the scope. A single oscillator can, of course, be used for providing both hetrodyning actions. For use in various other applications, the frequency of the scope may be changed by changing the various tuned circuits.

It may also be desirable to use a writing frequency different than 1 megacycle. This frequency, however, has been found to be very suitable for many applications since it is not so high that the design of the amplifiers and other components becomes critical, and at the same time is high enough to provide fast action. If this frequency is too low, the design of the amplifiers to provide high gain becomes more difficult, and also the spacing of the sidebands becomes closer so that frequency selection thereof is rendered more difficult.

As previously stated, the entire equipment required to provide the vector display may be housed in a cabinet of the same size as a standard oscilloscope having a cathode ray tube of the same size. The equipment is therefore very compact. The vector display scope has been found to be very satisfactory for various test purposes. Operation is relatively uncritical and the indication provided thereby is very convenient to use and is highly accurate.

Although certain embodiments of the invention have been described, it is obvious that various changes and modifications can be made within the intended scope of the invention as defined by the appended claims.

We claim:

1. Apparatus for displaying a test signal to be observed on the screen of a cathode ray tube as a vector, with the length of the vector representing the amplitude of the test signal and with the inclination of the vector representing the phase of the test signal with respect to a reference signal of the same frequency, said apparatus including in combination, first input terminal means adapted to be connected to a source of the test signal, an oscillator for producing a writing oscillation of a selected frequency, a network coupled to said first input terminal means and responsive to the test signal for producing a pair of components respectively in phase and in phase quadrature with the test signal, second input terminal means adapted to be connected to a source of the reference signal, a modulator coupled to said second input terminal means and to said oscillator for intermodulating said writing oscillation and the reference signal to produce selected sidebands, detector means coupled to said modulator and to said network for combining said selected sidebands with said pair of test signal components to produce two distinct signals of the frequency of said writing oscillation and having amplitudes corresponding respectively to the amplitude of the in-phase component and phase quadrature component of said test signal with respect to said reference signal, and means for utilizing said two distinct signals to deflect the cathode ray beam in said cathode ray tube along mutually perpendicular axes.

2. Apparatus for displaying a test signal to be observed on the screen of a cathode ray tube as a vector, with the inclination of the vector representing the phase of the test signal with respect to a reference signal of the same frequency, said apparatus including in combination, first input terminal means adapted to be connected to a source of the test signal, an oscillator for producing a writing oscillation of a selected frequency, a network coupled to said first input terminal means and responsive to the test signal for producing a pair of components respectively in phase and in phase quadrature with the test signal, second input terminal means adapted to be connected to a source of the reference signal, a modulator coupled to said second input terminal means and to said oscillator for intermodulating said writing oscillation and the reference signal to produce selected sidebands, detector means coupled to said network and to said modulator for combining said selected sidebands with said pair of components to produce two distinct signals of the frequency of said writing oscillation and respectively representing the in-phase and phase-quadrature components of said test signal with respect to said reference signal, means coupled to said oscillator for providing a direct current component to each of said two distinct signals with the polarity of the direct current component changing when the phase relation between said test and reference signals exceeds 180°, and means for utilizing said two distinct signals and their associated direct current components to deflect the cathode ray beam in said cathode ray tube along mutually perpendicular axes.

3. Apparatus for displaying a test signal to be observed on the screen of a cathode ray tube as a vector, with the inclination of the vector representing the phase of the test signal with respect to a reference signal of the same frequency, said apparatus including in combination, first input terminal means adapted to be connected to a source of the test signal, an oscillator for producing a writing oscillation of a selected frequency, a network coupled to said first input terminal means and responsive to the test signal for producing a pair of components respectively in phase and in phase quadrature with the test signal, second input terminal means adapted to be connected to a source of the reference signal, a modulator coupled to said second input terminal means and to said oscillator for intermodulating said writing oscillation and the reference signal to produce selected sidebands, detector means coupled to said network and to said modulator for combining said selected sidebands with said pair of components of said test signal to produce two distinct signals of the frequency of said writing oscillation and respectively representing the in phase and phase quadrature components of said test signal with respect to said reference signal, first and second polarized restorer means coupled to said oscillator and to said detector means for providing a direct current component to each of said two distinct signals, each of said restorer means including a balanced circuit having first and second detecting paths to which paths said writing oscillation is applied with opposite polarity and to which the corresponding distinct signal is applied with like polarity, said restorer means including differential adding means coupled to said rectifying paths to provide a direct current component to said corresponding distinct signal which corresponds in polarity and amplitude to the average value of said corresponding distinct signal, and means for utilizing said two distinct signals and their associated direct current components from said first and second restorer means to deflect the cathode ray beam in said cathode ray tube along mutually perpendicular axes.

4. Apparatus for displaying a test signal to be observed on the screen of a cathode ray tube as a vector, with the inclination of the vector representing the phase of the test signal with respect to a reference signal of the same frequency, said apparatus including in combination, first input terminal means adapted to be connected to a source of the reference signal, an oscillator for producing a writing oscillation of a selected frequency, a modulating unit coupled to said oscillator and to said first input terminal means for intermodulating said writing oscillation and the reference signal to produce selected side bands, second input terminal means adapted to be connected to a source of the test signal, network means including a quadrature delay circuit coupled to said second input terminal means for producing in response to the test signal a pair of components respectively in phase and in phase quadrature with the test signal, first and second synchronous detector means coupled to said modulating unit and to said network means for individually combining said selected sidebands with said pair of components of said test signal to produce two distinct signals of the frequency of said writing oscillation and respectively representing the in-phase component and phase quadrature component of said test signal with respect to said reference signal, and means for utilizing said two distinct signals to deflect the cathode ray beam in said cathode ray tube along mutually perpendicular axes.

5. Apparatus for displaying a test signal to be observed on the screen of a cathode ray tube as a vector, with the inclination of the vector representing the phase of the test signal with respect to a reference signal of the same frequency, said apparatus including in combination, first input terminal means adapted to be connected to a source of the reference signal, an oscillator for producing a writing oscillation of a selected frequency, a modulating unit coupled to said oscillator and to said first input terminal means for intermodulating said writing oscillation and the reference signal to produce selected sidebands, second input terminal means adapted to be connected to a source of the test signal, network means including a quadrature delay circuit coupled to said second input terminal means for producing in response to the test signal a pair of components respectively in phase and in phase quadrature with the test signal, first and second synchronous detector means coupled to said modulating unit and to said network means for individually combining said selected sidebands with said pair of components of said test signal, output filter means included in said synchronous detector means for selecting two distinct signals having the frequency of said writing oscillation and respectively representing the in-phase component and phase quadrature component of said test signal with respect to said reference signal, first and second synchronous restorer means individually coupled to said synchronous detector means and to said oscillator for providing a direct current component for each of said distinct signals, and means for utilizing said two distinct signals to deflect the cathode ray beam in said cathode ray tube along mutually perpendicular axes.

6. Apparatus for displaying a vector on the screen of a cathode ray tube with an inclination representing the phase of a first signal with respect to a second signal, said apparatus including in combination, first input terminals adapted to be connected to a source of the first signal, an oscillator for producing a writing oscillation of a selected frequency, a modulating unit coupled to said first input terminal means and to said oscillator for intermodulating said writing oscillation and the reference signal to produce selected sidebands, second input terminal means adapted to be coupled to a source of the second signal, network means including a quadrature circuit coupled to said second input terminal means for producing in response to the second signal a pair of components respectively in phase and in phase quadrature with the second signal, detector means coupled to said modulating unit and to said network means for individually combining said selected sidebands with said pair of components of said second signal to produce two distinct signals of the frequency of said writing oscillation and respectively representing the in-phase component and phase quadrature component of said second signal with respect to said first signal, and means coupled to said detector means for utilizing said two distinct signals to deflect the cathode ray beam in the cathode ray tube along mutually perpendicular axes.

References Cited in the file of this patent

UNITED STATES PATENTS

| | | |
|---|---|---|
| 2,305,614 | Goldstein | Dec. 22, 1942 |
| 2,313,966 | Poch | Mar. 16, 1943 |
| 2,337,968 | Brown | Dec. 28, 1943 |
| 2,551,828 | De Fremery | May 8, 1951 |

FOREIGN PATENTS

| | | |
|---|---|---|
| 857,657 | Germany | July 8, 1949 |